(12) United States Patent  
Thorpe et al.

(10) Patent No.: US 9,168,693 B2
(45) Date of Patent: Oct. 27, 2015

(54) LAMINATE MATERIAL

(71) Applicant: Nu Cleer Systems Limited, Parnell, Auckland (NZ)

(72) Inventors: Geoffrey Charles Thorpe, Parnell (NZ); Kevin Joseph Black, Remuera (NZ); Gavin Blair Watson, Taupo (NZ)

(73) Assignee: Nu Cleer Systems Limited, Auckland (NZ)

( * ) Notice: Subject to any disclaimer, the term of this patent is extended or adjusted under 35 U.S.C. 154(b) by 0 days.

(21) Appl. No.: 13/720,722

(22) Filed: Dec. 19, 2012

(65) Prior Publication Data

US 2013/0105070 A1 May 2, 2013

Related U.S. Application Data

(60) Division of application No. 12/779,840, filed on May 13, 2010, now abandoned, which is a continuation of application No. 12/302,009, filed as application No. PCT/NA2007/000123 on May 22, 2007, now abandoned.

(30) Foreign Application Priority Data

May 23, 2006 (NZ) .......................................... 547452
Dec. 8, 2006 (NZ) .......................................... 551963

(51) Int. Cl.
*B29C 53/00* (2006.01)
*B29C 53/04* (2006.01)
(Continued)

(52) U.S. Cl.
CPC ............. *B29C 53/005* (2013.01); *B29C 51/002* (2013.01); *B29C 53/04* (2013.01); *B32B 3/00* (2013.01); *B32B 27/08* (2013.01);
(Continued)

(58) Field of Classification Search
CPC .... B29C 53/005; B29C 53/04; B32B 38/0012
USPC ...................................... 156/222; 264/331.18
See application file for complete search history.

(56) References Cited

U.S. PATENT DOCUMENTS 2,917,783 A 12/1959 Olson
3,700,546 A * 10/1972 Terenzi .......................... 428/431
(Continued)

FOREIGN PATENT DOCUMENTS

EP 0 522 405 A1 1/1993
EP 0 622 386 B1 1/1998
(Continued)

OTHER PUBLICATIONS

Man Made Marvels; Okinawa Aquarium, www.offthefence.com (2005).
(Continued)

*Primary Examiner* — Daniel Lee
(74) *Attorney, Agent, or Firm* — Knobbe Martens Olson & Bear LLP

(57) ABSTRACT

A self supporting curved laminate product resulting from curving of a planar precursor, wherein the planar precursor is a self supporting laminate of two sheets of an acrylic thermoplastic, or of sheets including an acrylic thermoplastic, spaced by, but attaching to, an interposed thermoset polyester system, and wherein curving has involved heating of the laminate sufficient to allow its curving without any substantial degradation of the lamination or its component layers.

33 Claims, 7 Drawing Sheets

(51) Int. Cl.
  B32B 38/00     (2006.01)
  B29C 51/00     (2006.01)
  B32B 3/00      (2006.01)
  B32B 27/30     (2006.01)
  B32B 27/36     (2006.01)
  B32B 27/08     (2006.01)
  B29C 51/14     (2006.01)

(52) U.S. Cl.
  CPC ............. *B32B 27/30* (2013.01); *B32B 27/308* (2013.01); *B32B 27/36* (2013.01); *B32B 38/0012* (2013.01); *B29C 51/14* (2013.01); *B32B 2250/03* (2013.01); *B32B 2250/24* (2013.01); *B32B 2250/40* (2013.01); *B32B 2307/412* (2013.01); *B32B 2307/554* (2013.01); *B32B 2307/718* (2013.01); *B32B 2307/738* (2013.01); *B32B 2419/00* (2013.01); *B32B 2479/00* (2013.01); *B32B 2605/12* (2013.01); *Y10T 156/1044* (2015.01); *Y10T 428/2495* (2015.01); *Y10T 428/24628* (2015.01); *Y10T 428/24967* (2015.01); *Y10T 428/269* (2015.01); *Y10T 428/31797* (2015.04)

(56) References Cited

U.S. PATENT DOCUMENTS

| | | | |
|---|---|---|---|
| 3,707,434 A * | 12/1972 | Stayner | 428/313.5 |
| 3,810,815 A | 5/1974 | Welhart et al. | |
| 3,993,828 A | 11/1976 | McCorsley, III | |
| 4,125,669 A * | 11/1978 | Triebel et al. | 428/412 |
| 4,648,925 A | 3/1987 | Goepfert et al. | |
| 4,936,936 A | 6/1990 | Rohrbacher | |
| 5,055,346 A | 10/1991 | Rohrbacher | |
| 5,705,275 A * | 1/1998 | Nakano et al. | 428/413 |
| 6,476,111 B1 * | 11/2002 | Beauchemin et al. | 524/423 |
| 6,793,747 B2 | 9/2004 | North et al. | |
| 6,811,857 B1 | 11/2004 | Bravet et al. | |
| 2001/0041251 A1 | 11/2001 | Bravet et al. | |
| 2003/0021986 A1 | 1/2003 | Yu et al. | |
| 2003/0130414 A1 | 7/2003 | Brandenburg et al. | |
| 2003/0194540 A1 | 10/2003 | Fusco | |
| 2004/0161611 A1 | 8/2004 | Mueller et al. | |
| 2008/0152772 A1 * | 6/2008 | Bernig et al. | 426/410 |

FOREIGN PATENT DOCUMENTS

| | | |
|---|---|---|
| GB | 1140743 A | 1/1969 |
| GB | 1562432 | 3/1980 |
| GB | 2141971 A | 1/1985 |
| JP | 06149167 A2 | 5/1994 |
| JP | 06200643 A2 | 7/1994 |
| JP | 2001-500812 | 1/2001 |
| JP | 2002-518207 | 6/2002 |
| WO | WO 00/29212 | 5/2000 |
| WO | WO 00/51458 A | 9/2000 |
| WO | WO 03 011966 | 11/2006 |
| WO | WO 2006/132875 | 12/2006 |

OTHER PUBLICATIONS

Acrylic Panel Maker Enters Projection Screen Market; www.jetro.go.jp (2005).
International Search Report dated Nov. 20, 2007 for PCT Application No. PCT/NZ2007/000123.
Restriction Requirement dated Dec. 13, 2011 for U.S. Appl. No. 12/779,840.
Office Action dated Feb. 29, 2012 for U.S. Appl. No. 12/779,840.
Final Office Action dated Sep. 7, 2012 for U.S. Appl. No. 12/779,840.
European Supplementary Search Report dated in European Patent Application No. 07793949.4.
IPRP for PCT/NZ2007/000123, dated Nov. 27, 2008.

* cited by examiner

FIG. 7a   FIG. 7b

LAMINATE MATERIAL

CROSS REFERENCE TO RELATED APPLICATIONS

This application is a divisional application of U.S. patent application Ser. No. 12/779,840, filed on May 13, 2010, which is a continuation of International Application PCT/NZ2007/000123, filed on May 22, 2007. The entire content of each and every one of the applications identified above is hereby incorporated herein by reference. International Application PCT/NZ2007/000123 entered the National Phase in the U.S. on Nov. 21, 2008 as application Ser. No. 12/302,009 and claims priority to New Zealand Application No. 547452, filed on May 23, 2006 and New Zealand Application No. 551963 Dec. 8, 2006.

FIELD OF THE INVENTION

The present invention relates to a laminate material and the method by which it is produced. More particularly but not exclusively it relates to a laminate material having one or more internal layers of polyester resin, and its method of preparation and shaping.

BACKGROUND OF THE INVENTION

In one aspect the invention relates to the technology of building materials. Glass is a very common such material. Although it has a number of advantages, transparency being an obvious one, it has a number of disadvantages. Glass is heavy, breakable and can be difficult to manufacture and to form. The problems associated with glass include the weight, lack of insulating and sound proofing properties.

We propose the use of an acrylic. Many variations and types are used, mainly in signage, walkways building canopies and skylights, for example. It has medium to high impact resistance, and has good resistance to scratching. However it is still inferior to glass in a number of areas. Greater thickness is required over certain dimensions and spans in comparison to glass.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention, as it existed before the priority date.

It is an object of the present invention to provide a laminate material of self-supporting character and preferably having one or more superior properties over glass, particularly when used as a construction or manufacturing material.

Additionally or alternatively it is an object of the present invention to provide a laminate material, which can be shaped or formed.

Additionally or alternatively it is an object of the present invention to provide a novel method of preparing a laminate material.

Additionally or alternatively it is an object of the present invention to provide a laminate material that at least provides the public with a useful choice.

Other objects of the invention may become apparent from the following description, which is given by way of example only.

SUMMARY OF THE INVENTION

In an aspect the invention consists in a self supporting curved laminate product resulting from curving of a planar precursor, wherein the planar precursor is a self supporting laminate of two sheets of an acrylic thermoplastic, or of sheets including an acrylic thermoplastic, spaced by, but attaching to, an interposed thermoset polyester system, and wherein curving has involved heating of the laminate sufficient to allow its curving without any substantial degradation of the lamination or its component layers.

Preferably said heating has been into the range of from 105° C. to 120° C.

Preferably one or both sheets is of an acrylic plastic or is at least primarily acrylic plastic.

Preferably said polyester system has been prepared at least in part from (A) carboxylic acid(s) or dicarboxylic acid(s) with (B) a component or components providing (a) hydroxyl(s) and/or dihydroxyl(s).

Preferably said polyester system involves a co-reactive monomer.

A preferred co-reactive monomer is styrene or a styrene derivative or analogue.

Preferably the co-reactive monomer is styrene or a styrene analogue that is present in the polyester system in a quantity from 30-55% w/w and most preferably, if styrene, 35-45% w/w.

Preferably the system when cured has an elongation at break greater than 150% (preferably greater than 170%).

Preferably the unsaturated polyester resin containing ethylenic unsaturation is present in the range of from 45-70% w/w.

Preferably the polyester system is or has been catalysed by free radical initiators, eg; a chemical initiator not reliant upon UV light. Alternatively, it can have been catalysed by a UV initiator of free radicals.

Preferably the polyester system has included or includes a metal salt provider to speed gel time upon initiation. This is particularly the case if a peroxide free radial initiator such as a MEKP is utilised (Methyl Ethyl Ketone Peroxide).

Preferably the level of said metal salt promoter is of the same order of or is less than the level of inclusion of any such initiator.

Preferably the level of any such initiator is no more than about 2% w/w of the system prior to the thermoset.

Preferably the level of such an initiator is less than 1% w/w of the thermoset system.

Preferably the lamination of the cursor laminate has involved the laying between the sheets, or the laying on one sheet and subsequent placement of the second sheet, of a liquid polyester system and thereafter allowing its thermoset.

Preferably the polyester resin system was a mix of:

45-70% w/w unsaturated polyester resin containing ethylenic unsaturation, 30-55% w/w styrene, less than 2% w/w catalyst (eg; MEKP), and less than 2% w/w initiator (eg; metal salt provider).

Preferably the polyester resin system was mixed in the temperature range 18 to 22° C. (preferably about 20° C.). Preferably the polyester resin system sets at temperature(s) in the range 20° C. to 24° C. (preferably 22° C.).

Preferably the polyester resin system was mixed at a humidity in the range 57% to 67% (preferably about 62%). Preferably the resin is allowed to thermoset as a result of chemical initiation and its exothermicity at a humidity in the range of from 57% to 75% (preferably 62% to 73%) (eg; about 67%).

Preferably that surface of the acrylic plastic which is to interface with the polyester system is a clean face, ie; free of release agents and/or migrating materials from any removed cover sheet.

Preferably the surface of the sheets has been subjected to cleaning with a solvent.

Preferably said sheets have had the surface thereof to be presented to the polyester system, prior to its thermoset, cleaned with isopropyl alcohol.

Preferably said "without any substantial degradation" has involved some deformation of each layer but has not lead to any substantial detachment of the polyester system attachment to each said sheet.

Preferably throughout the curving process the interposed polyester system has remained non liquid, ie; has stretched, deformed, slipped and/or otherwise changed in shape without manifesting liquid characteristics, eg; as if it were a rubber or like material.

Preferably said interposed thermoset polyester system is of an unsaturated polyester system containing ethylenic unsaturation that has been linked with a coreactive monomer.

Preferably the polyester system is one which (without wishing to be limited to a theory) provides an attachment to each sheet as a result of either or both cross linking with any free unsaturation in the acrylic material free monomer solvation of the acrylic material.

Preferably there is both chemical, (ie; said cross linking) and physical adhesive (ie; free monomer solvation of the acrylic material) attachment.

Preferably said polyester system has thermoset to a non tacky form at its interface with the acrylic material and it is only where there is air access to the material that there is a residual tackiness. Preferably the material has a pliable physical character at ambient temperatures.

Optionally the polyester system includes one or more of pigmentation(s), fire retardant additive(s) and filler(s).

Preferably the laminate is transparent.

Preferably the acrylic sheet(s) have been mixed and/or cured at about 20° C. and/or about 65% humidity.

In another aspect the invention consists in a self supporting laminate product comprising or including two sheets of an acrylic thermoplastic, or of sheets including an acrylic thermoplastic, spaced by, but attaching to, an interposed thermoset polyester system, the interposed polyester system being of some or all of, or at least, Preferably one or both sheets is of an acrylic plastic or is at least primarily acrylic plastic.

Preferably styrene is present at 35-45% w/w.

Preferably the system when cured has an elongation at break greater than 150% (preferably greater than 170%).

Preferably the polyester system is or has been catalysed by free radical initiators, eg; a chemical initiator not reliant upon UV light. Alternatively, it can have been catalysed by a UV initiator of free radicals.

The polyester system has preferably included or includes a metal salt provider to speed gel time upon initiation. This is particularly the case if a peroxide free radial initiator such as a MEKP is utilised (Methyl Ethyl Ketone Peroxide).

Preferably the level of said metal salt promoter is of the same order of or is less than the level of inclusion of any such initiator.

Preferably the level of any such initiator is no more than about 2% w/w of the system prior to the thermoset.

Preferably the level of such an initiator is less than 1% w/w of the thermoset system.

Preferably the lamination of the cursor laminate has involved the laying between the sheets, or the laying on one sheet and subsequent placement of the second sheet, of a liquid polyester system and thereafter allowing its thermoset.

Preferably the polyester resin system was a mix of:

45-70% w/w unsaturated polyester resin containing ethylenic unsaturation, 30-55% w/w styrene, less than 2% w/w catalyst (eg; MEKP), and less than 2% w/w initiator (eg; metal salt provider).

Preferably the polyester resin system was mixed in the temperature range 18 to 22° C. (preferably about 20° C.). Preferably the polyester resin system sets at temperature(s) in the range 20° C. to 24° C. (preferably 22° C.).

Preferably the polyester resin system was mixed at a humidity in the range 57% to 67% (preferably about 62%). Preferably the resin is allowed to thermoset as a result of chemical initiation and its exothermicity at a humidity in the range of from 57% to 75% (preferably 62% to 73%) (eg; about 67%).

Preferably that surface of the acrylic plastic which is to interface with the polyester system is a clean face, i.e.; free of release agents and/or migrating materials from any removed cover sheet.

Preferably the surface of the sheets has been subjected to cleaning with a solvent.

Preferably said sheets have had the surface thereof to be presented to the polyester system, prior to its thermoset, cleaned with isopropyl alcohol.

Preferably said "without any substantial degradation" has involved some deformation of each layer but has not lead to any substantial detachment of the polyester system attachment to each said sheet.

Preferably the laminate can be subjected to a curving process under non destructive heating during which the interposed polyester system remains non liquid, i.e.; can stretch, deform, slip and/or otherwise change in shape without manifesting liquid characteristics, eg; as if it were a rubber or like material.

Preferably the polyester system is one which (without wishing to be limited to a theory) provides an attachment to each sheet as a result of either or both cross linking with any free unsaturation in the acrylic material free monomer solvation of the acrylic material.

Preferably there is both chemical, (i.e.; said cross linking) and physical adhesive (i.e.; free monomer solvation of the acrylic material) attachment.

Preferably said polyester system has thermoset to a non tacky form at its interface with the acrylic material and it is only where there is air access to the material that there is a residual tackiness. Preferably the material has a pliable physical character at ambient temperatures.

Optionally the polyester system includes one or more of pigmentation(s), fire retardant additive(s) and filler(s).

Preferably the laminate is transparent.

Preferably the acrylic sheet(s) have been mixed and/or cured at about 20° C. and/or about 65% humidity.

In another aspect the invention is a self supporting transparent laminate able to be curved when all layers of the laminate are heated to a temperature or temperatures unable to melt any layer to a liquid form, the laminate being of a transparent polyester system interposed and attaching to flanking transparent thermoplastic layers (the same or different), which thermoplastic layers attach to the polyester system by both cross linking with any free unsaturation in the acrylic material free monomer solvation of the acrylic material.

In another aspect the invention is a self supporting transparent laminate able to be curved when all layers of the laminate are heated to a temperature or temperatures unable to melt any layer to a liquid form, the laminate being of a transparent polyester system interposed and attaching to flanking transparent acrylic thermoplastic layers (the same or different).

In another aspect the invention is a self supporting transparent laminate greater than 3 mm thick able to be curved when all layers of the laminate are heated to a temperature or temperatures unable to melt any layer to a liquid form, the laminate being of a transparent polyester system interposed and attaching to flanking transparent thermoplastic layers (the same or different), the polyester system being at least 0.5 mm thick.

The polyester system can account for from 5% to 40% of overall laminate thickness.

Preferably in any of the foregoing laminates the polyester system layer is at least 1 mm thick (preferably from 1 to 3 mms thick, eg; about 2 mm)

Preferably the acrylic sheet(s) is (are) at least 0.5 mm thick. More preferably from 0.5 to 5 mm thick (eg; about 2 mm)

The laminates can be symmetric as to pairing of the acrylic layers (thickness and/or material), or not. They can be asymmetric.

The laminates can also, or instead, be symmetric three, five, seven or more layered panels, or not. A five layer laminate would have two polyester system layers.

In another aspect the invention is a self supporting transparent planar laminate (preferably able to be curved when all layers of the laminate are heated to a temperature or temperatures unable to melt any layer to a liquid form), the laminate being of a transparent polyester system interposed and attaching to flanking transparent acrylic thermoplastic layers (the same or different) (ie; a symmetric three layer system where the acrylic layers are symmetric with each other and, also preferably of the same thickness as the polyester, the laminate system having a performance related to a notional variant having acrylic layers 2 mm thick on the outside and a polyester system 2 mm thick, being able without fracture and/or delamination to withstand a challenge loading in excess of 40 tonnes into its edges, on its minor axis if notionally a rectangle of 960×470 mms.

By way of example a polyester resin system in the form of
45-70% w/w unsaturated polyester resin containing ethylenic unsaturation,
30-55% w/w styrene,
less than 2% w/w catalyst (eg; MEKP), and
less than 2% w/w initiator (eg; metal salt provider), and
a thickness of 2 mm, 2 mm and 2 mm through the three layer laminate, when a rectangular panel of 960×470 mm squeezed on its minor axis can withstand without delamination between 60 and 80 tonnes.

The present invention therefore envisages laminates analogous to such performing laminates whether to be used in a planar form or in a curved form.

In another aspect the invention is a transparent laminate of at least three layers to an overall thickness of greater than 3 mm wherein a polyester resin system as a layer attaches to each of two acrylic layers the polyester resin system interposes.

In another aspect the invention is a transparent laminate of at least three layers to an overall thickness of greater than 3 mm wherein a polyester resin system as a layer attaches to each of two acrylic layers the polyester resin system interposes, the laminate being able to be curved under non destructive heating to a curved self supporting transparent form.

In another aspect the invention is a transparent laminate of at least three layers to an overall thickness of greater than 3 mm wherein a polyester resin system as a layer attaches to each of two acrylic layers the polyester resin system interposes, wherein the laminate is of any of the kinds previously defined.

In another aspect the invention is the use or methods of use and resulting structures of any planar and/or curved laminates as aforesaid.

In another aspect of the invention there is provided a laminate comprising:
a) a first thermoplastic layer,
b) a second thermoplastic layer, and
c) a thermoset resin layer intermediate between the first and second layers, wherein the thermoset layer is bonded to both layers and wherein there is a degree of cross linked bonding between the resin and the thermoplastic layers.

Preferably the thermoset resin is an unsaturated polyester resin. More preferably the thermoset resin, prior to curing, is a solution of a polyester in a monomer. Preferably the cross linked bonding is between the monomer and unsaturated sites available for bonding in the thermoplastic layers.

Preferably the monomer is styrene.

Preferably the resin has 30-45% styrene content.

Preferably the resin has an elongation at break of >150%; more preferably it has an elongation at break of around 170%.

Preferably the resin has a glass transition temperature less than ambient temperature.

Preferably the styrene of the resin softens the surface of the thermoplastic layers allowing some degree of penetration of the resin into the thermoplastic layers.

In one embodiment at least one or both of the thermoplastic layers is polyethylene terphthalate glycol. In an alternative embodiment at least one or both of the thermoplastic layers is acrylic.

Preferably when the thermoplastic layer(s) is/are acrylic there is cross linking between unsaturated methyl methacrylate in the acrylic with the styrene monomer of the resin.

Preferably the resin has been catalysed by the addition of a free radical inhibitor; more preferably by the addition of a methylethyl ketone peroxide catalyst.

Preferably the acrylic is Polymethyl methacrylate (PMMA) or poly(methyl 2-methylpropenoate); preferably it is SHINKOLITE™ acrylic from Mitsubishi Rayon Japan.

Preferably the thermoplastic layer(s) have a degree of styrene resistance; preferably a high degree of styrene resistance. Alternatively or additionally the thermoplastic layer(s) have a styrene resistant surface coating.

Optionally the thermoplastic sheet(s) may be treated with one or more of the following:
a mar resistant coating
solar protective additives (added after preparation or in its resin state upon preparation)
texturing/etching/embossing/paint
applied photographic imagery, transfers or reflective mirror coatings
vinyls and metallic materials such as aluminium can be bonded and pressed onto outer surfaces
an annealing process Optionally the thermoset resin may include or be treated with one or more of the following:
pigmentation
fire retardant additives
filler materials.

Preferably the laminate of the invention is substantially transparent with a TV (rating total visible light) close to 100%.

Preferably when the thermoplastic sheet(s) is/are acrylic, they have been mixed under the pour conditions of around 20°

C. temperature and around 65% humidity, and cured at around 20° C. and around 65% humidity.

In another aspect of the invention there is provided a method of preparing a laminate comprising the steps of:
provide resin precursor materials,
adding a catalyst the resin precursor materials to give a catalysed thermoset resin,
inserting a layer of the catalysed thermoset resin between two thermoplastic layers, and
allowing the catalysed thermoset resin (the resin) to bond to the two thermoplastic layers,
wherein the step of allowing the resin to bond to the thermoplastic layers includes allowing the resin to cross link with the thermoplastic layers.

Preferably the catalysted thermoset resin formed in the first step is an unsaturated polyester resin; more preferably of a polyester in styrene monomer. Preferably the resin has 30-45% by weight styrene content. Preferably the resin has an elongation at break of >150%. Preferably the resin has a glass transition temperature less than ambient temperature.

Preferably the step of bonding includes cross linking between the thermoplastic layers and the styrene monomer of the resin. Preferably the step of bonding further includes softening of the surface of the thermoplastic layers by the styrene and a degree of penetration of the resin into the thermoplastic layers.

In one preferred form the thermoplastic layers are acrylic layers and the step of bonding includes cross linking between the styrene monomer of the resin with unsaturated methyl methacrylate sites of the acrylic.

In one embodiment the method is a batch process and the step of inserting a layer of the resin between two thermoplastic layers comprises pouring liquid (prior to gelation or curing) resin between two supported thermoplastic sheets and allowing to cure.

In an alternative embodiment the method is a continuous process and the step of inserting a layer of the resin between two thermoplastic sheets comprises advancing a first sheet or layer of the resin through a laminating station where at least one or preferably two of the thermoplastic layers contact the sheet or layer of resin.

In one form of the embodiment the resin is in a pre-gel state.

In another form of the embodiment the resin is in a gel-like state, at or near gelation of the resin.

In another form of the embodiment the resin is in a cured state and the step of advancing the resin may include heating the resin and/or one or both of the thermoplastic sheets to at least soften the resin and/or one or both of the thermoplastic sheets, prior to, or at about the same location as, or after, the laminating station.

In a further aspect there is provided a laminate material prepared according the above method.

In a further aspect of the invention there is provided a method of producing a curved laminate material comprising the steps of:
providing a laminate as hereinbefore described or produced according to the abovementioned method, wherein the thermoset resin has an elongation at break of >150% and a glass transition temperature less than ambient temperature,
heating a shaping region of the laminate to a shaping temperature,
shaping the laminate to the desired curvature,
cooling the laminate,
wherein the step of heating the shaping zone of the laminate comprises heating substantially through all layers (including the thermoset and thermoplastic layers) of the laminate in the shaping zone.

Preferably the step of heating the shaping region comprises applying heat to the shaping region from both a top surface of the laminate in the shaping region, and a bottom surface of the laminate in the shaping region.

Preferably the conditions of the heating step, including one or both of the shaping temperature and the duration of the heating, is/are not sufficient to result in annealing of any of the layers of the laminate in the heating region.

Preferably the step of cooling the shaping region comprises allowing the laminate to cool to ambient temperature.

Preferably the step of shaping the laminate comprises placing the substrate over a mould or template and applying pressure (which may simply be gravity) to one or more regions of the laminate adjacent the shaping region.

In a further aspect there is provided a curved laminate material or article incorporating a region of curved laminate prepared according the above method.

BRIEF DESCRIPTION OF THE DRAWINGS

The invention will now be described by way of example only and with reference to the drawings in which:

FIGS. 7a, 7b, 7c illustrates side views of the jig of Example 3;

DEFINITIONS

Figure 1:
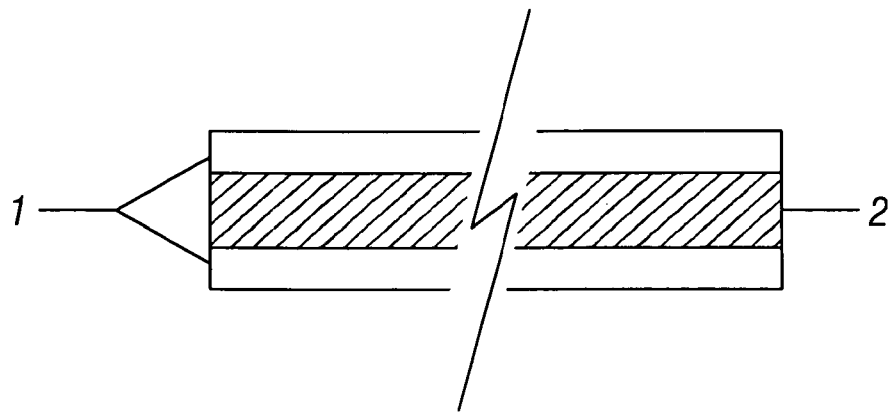
FIG. 1 illustrates a perspective end view showing a transparent laminate constructed with principles of the present invention.

As used herein the term "and/or" means "and" or "or", or both.

As used herein "(s)" following a noun means the plural and/or singular forms of the noun.

"The term "comprising" as used in this specification and claims means "consisting at least in part of"; that is to say when interpreting statements in this specification and claims which include "comprising", features, other than those prefaced by this term in each statement, can also be present. Related terms such as "comprise" and "comprised" are to be interpreted in similar manner."

As used herein is apparent that the term "thermoset" in respect of the polyester system encompasses a chemical initiated and/or UV light initiated polymerisation between the unsaturated polyester resin with its ethylenic unsaturation and the coreactive monomer(s). Once there has been such a thermoset, even if still to a pliable form (preferably non-tacky when excluded from ambient air), the material nonetheless can be deformed at the elevated temperature (i.e.; above ambient) required or chosen for reshaping of the thermoset acrylic material sheets without any substantial degradation of the laminate including the attachment of the polyester system to the acrylic material.

As used herein the term "curving" (and any derivative thereof eg; "curve" or "curved") encompasses any mechanical manipulation of the precursor laminate that provides a three dimensional out come from the planar laminate eg; a curve of any shape, any bulge, any fold, etc. and includes part only of the overall precursor laminate sheet or all of it.

As referred to herein the term "laminate" preferably refers to a planar or curved sheet where the outer sheets (eg; of thermoplastic) and the interposed material of the polyester system is substantially coextensive. In some applications however this need not be the case, i.e.; there can, if desired, be unmatching of the outer sheets with respect to each other and/or one or both of the outer sheets with respect to the extent of the interposed polyester system, eg; if desired, some parts of an overall laminate could have direct fixing of one outer sheet to the other whilst other regions thereof have the polyester system interposed between such sheets.

As used herein, the term "forming" refers to any process by which the shape of a sheet is altered and includes, but is not limited to, bending, shaping, stretching, compressing, curving or arching a sheet.

As used herein, the term "styrene resistance" refers to the ability of the thermoplastic sheet(s) to resist the corrosive effect/attack of styrene. It is likely to relate to the resistance of the sheet to solubilisation by or in styrene. Styrene is present for example in one preferred thermoplastic resin.

As used herein, the term "transparency" refers to allowing of light to pass through the glazing without causing distortion, loss of clarity, or altering light transmission.

As used herein, the term "haze" refers to dullness or cloudiness. This can occur due to incompatibility of a resin with the outer sheets. For example the inner surface of the sheet becomes stressed and can react by separating its surface, and in severe cases complete delamination.

"Elongation" or "Elongation at break" is a standard measure for the amount a sample can stretch as a percentage of original length before it fails or breaks.

"Glass transition temperature" in respect of the resin means the temperature at which a reversible change occurs in the resin to undergo a rather sudden transition from a hard, glassy, or brittle condition to a flexible or elastomeric condition.

DETAILED DESCRIPTION OF THE PREFERRED EMBODIMENT

This invention relates to a laminate material comprising a layer of thermoset resin inserted between two or more thermoplastic sheets. The preferred thermoplastic sheets are of acrylic, or polyethylene terphthalate glycol (P.E.T.G.).

Figure 2:
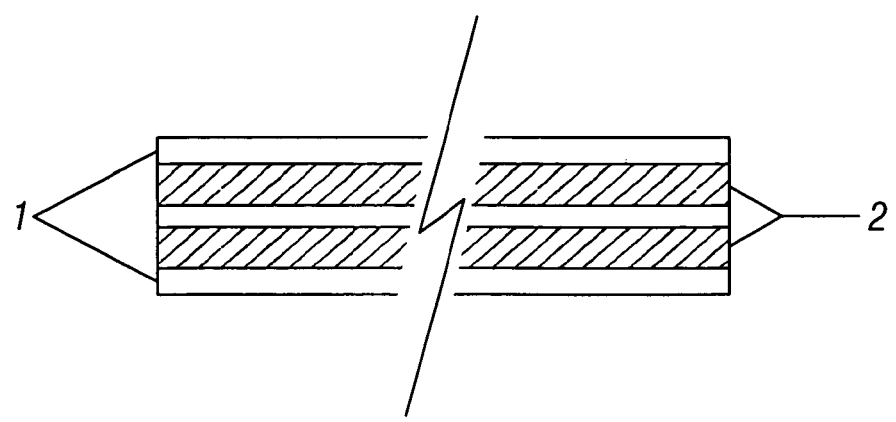
FIG. 2 illustrates a perspective end view showing a transparent multiple ply constructed with principles of the present.

FIG. 1 illustrate such a laminate, with outer sheets 1, of acrylic, or P.E.T.G. and an inner layer 2 of resin. The thickness of the laminate when complete can vary depending on the thickness of the resin inserted between the thermoplastic sheets and also to the number and thickness of thermoplastic sheets and resin employed. FIG. 2 illustrates such a multi-ply laminate.

There have been several attempts to provide laminates using various forms of plastic sheets and protective coverings. Although this invention was initially developed as an alternative to glass for use in the building and construction industry, the invention has wide reaching applications as a result of the lightweight, extreme strength and formability of the laminate panel. For example, the panel can be formed or worked to construct boat hulls, vehicle construction including monocoque assembly and outside panels, furniture, household appliances and a wide variety of manufactured goods. It should therefore be regarded as a construction and manufacturing material.

The simplest embodiment of the laminate material of the invention is a single layer of thermoset polyester resin sandwiched between two layers of thermoplastic acrylic, or P.E.T.G. (as illustrated in FIG. 1).

One preferred method of preparing the laminate sheet is a continuously manufactured process by which the two sheets are brought together and injected with the unsaturated polyester resin at the correct temperature and humidity required for the resin curing process. The resin is bonded with the outer sheets. One alternative method of preparation is a batch process involving assembling the two outer sheets in a parallel arrangement in a jig or equivalent, and pouring or injecting the resin between the sheets.

Another alternative is to manufacture the resin to the required thickness in sheet form, or in continuous form. The continuous resin can be then rolled and stored onto a drum ready for introduction to manufacturing process. When ready the two outer thermoplastic sheets can be heated and pressed either side of the solidified resin (which may have been heated) to create a solid ply. The bonding between the resin and sheets must be controlled accordingly.

One further aspect of the invention relates to a method of forming or shaping the laminate and the ability of the laminate to be formed. Once prepared the laminate is then heated to a temperature, at which the laminate can be formed or shaped, and then forming or shaping the laminate to a desired curvature and configuration. This invention includes the forming of a laminate in both single and complex curvatures. For example, a curvature shape, a corrugation shape and a 90° angle are achievable with the present invention after a thermoforming procedure.

a) Thermoplastic Sheets

The preferred outer sheets of the laminate can be of acrylic or P.E.T.G. sheeting.

By acrylic we mean a material composed of various clear, thermoplastic resins obtained from acrylic acid and its derivatives, and from raw natural sources such as petroleum and natural gas. moulded, and thermoformed. By P.E.T.G. we mean glycol-modified terephthalate glycol.

All of the above preferably have inherent chemical resistance to the styrene as one preferred thermoset resin contains styrene. Sheets that have insufficient styrene resistance (i.e. are likely to dissolve in or disintegrate upon contact with, styrene) are subject to poor adhesion, break down of the sheet surface due to the corrosive reaction build up on the contact face to be bonded.

An alternative approach to the styrene resistance requirement is the use of a styrene resistant coating on the sheeting prior to exposure to the resin. This is a protective coating acting as a barrier between the sheeting and the resin, as would be contemplated by one skilled in the art.

Standard acrylic plastic sheet is a more cost effective material with good optical properties, and less resistant to scratching in comparison to P.E.T.G. Further, the less cross linked the acrylic structure, the more suitable for the laminate of the invention as the free methyl methacrylate sites can cross link with the resin as discussed below. However, all materials are employed within the scope of the invention. The laminate can contain two (or more) layers of acrylic; or two (or more) layers of P.E.T.G.

b) The Resin Material

As would be known by one skilled in the art there are a number of thermoset resins which are capable of bonding two thermoplastic sheets together. However the resin suitable for the laminate of the invention must have the following characteristics—

- An unsaturated polyester resin
- Elongation at break characteristics sufficient to allow thermoforming of the laminate. Preferably an elongation over 150%; more preferably an elongation of around 170% or higher.
- A low glass transition temperature, which is less than ambient temperature.
- The preferred use of styrene as the monomer. Preferred styrene content is in the range 40-45%. Most polyester resins are viscous, pale coloured liquids consisting of a solution of a polyester in a monomer. The addition of styrene in amounts of up to 50% helps to make the resin easier to handle by reducing its viscosity. The styrene also performs the vital function of enabling the resin to cure from a liquid to a solid by 'cross-linking' the molecular chains of the polyester, without the evolution of any by-products. In the case of the current laminate invention we believe the styrene also has the role of softening the thermoplastic layers of the outer sheeting thereby assisting in the bonding process. In the case of acrylic sheeting the styrene may also be cross linking with unsaturated methyl methacrylate sites.
- For use in moulding, a polyester resin can benefit from the addition of several ancillary products. In particular a catalyst is required in the invention. The catalyst is added to the resin system shortly before use to initiate the polymerisation reaction. The catalyst does not take part in the chemical reaction but simply activates the process. Accelerators may also be used to speed up the curing process.

Upon addition of the catalyst, in the presence of the styrene, the styrene cross-links the polymer chains in a polymerisation process, to form a complex three-dimensional network. This is the curing process.

Care is needed in the preparation of the resin mix prior to moulding. The resin and any additives must be carefully stirred to disperse all the components evenly before the catalyst is added. This stirring must be thorough as any air introduced into the resin mix affects the quality of the final moulding. This is especially so when laminating with layers of reinforcing materials as air bubbles can be formed within the resultant laminate which can weaken the structure. It is also important to add the accelerator (if any) and catalyst in carefully measured amounts to control the polymerisation reaction to give the best material properties. Too much catalyst will cause too rapid a gelation time, whereas too little catalyst will result in under-cure.

An alternative monomer to styrene is methyl methacrylate. This is also within the scope of the invention.

Preferred Resin

One preferred resin we use is NC007 resin. This is a flexible, low viscosity, clear unsaturated polyester resin in styrene monomer. It is preferably prepromoted (i.e. pre-mixed together and batched prior to the introduction of the catalyst). We recommend that it should be gelled and cured with between 0.75 and 2% of a medium reactivity MEKP catalyst. MEKP (Methyl Ethyl Ketone Peroxide, a free radical initiator) is the catalyst added to polyester resins and vinyl ester resins. As the catalyst mixes with the resin, a chemical reaction occurs (as mentioned previously), creating heat, which cures (hardens) the resin.

| NC007 TYPICAL LIQUID PROPERTIES: | |
|---|---|
| Viscosity @ 25° C. | 1.5 ps |
| Gel time @ 25° C. 1% MEKP | 45 minutes |
| Volatile content | 36% |
| Appearance | Clear pale pink |

| NC007 TYPICAL PHYSICAL PROPERTIES: | |
|---|---|
| % elongation at break | 170% |
| Tensile strength | 3.2 mPa |

The performance and characteristics of this resin during thermoforming is crucial to the success of the laminate.

Figure 3:
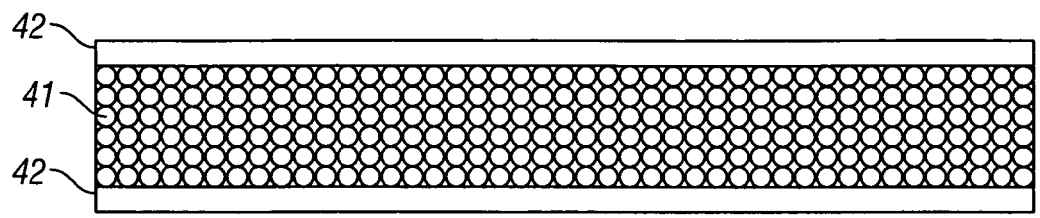
FIG. 3 illustrates the molecular characteristics of the unsaturated polyester resin before the laminated sheet is thermoformed into shape.

Our preferred resin has an elongation percentage capacity of around or above 150%. This particular resin has an elongation at break of around 170%. It must be worked at between 105° C. and 120° C. At these temperatures we observe increased malleability allowing the molecules to stretch, settle, and when cooled hold their elongation and adhesion to the sheet surface. This can be shown in FIGS. 3 and 4. FIG. 3 shows the laminate structure prior to forming including resin 41 and thermoplastic layers 42.

(a) During the heating process the molecules of the resin begin to change shape and expand as the laminate product becomes more malleable. When the heating process begins prior to the forming and shaping process, the molecular structure of the internal resin within the laminate changes shape from being circular and honey combed to a more elongated state and stretches along the laminate surface as it is bent into shape.

Figure 4:
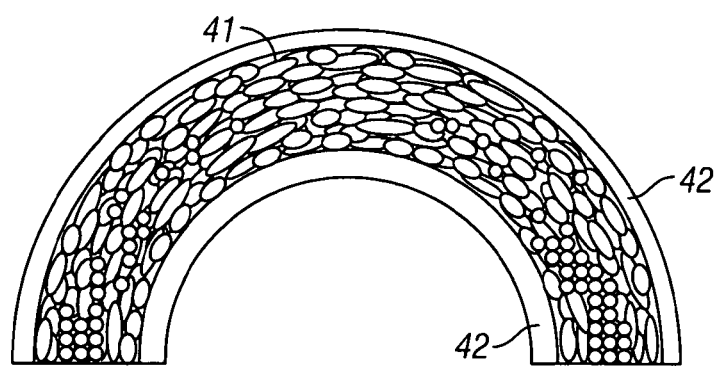
FIG. 4 illustrates the molecular characteristics of the unsaturated polyester resin when the laminated sheet is thermoformed into one desired shape.

(b) When the temperature of all layers reach the desired forming temperature of between 105° C. and 120° C. forming is commenced. The time that the temperature takes to produce the penetration required will depend on the thickness of the ply being formed. FIG. 4 illustrates the change in structure of the resin 41 and thermoplastic layers 42 upon heating.

The fact that the product can be laminated, then put through a thermo-forming process which involves the heating of the finished product, bending or forming into any shape, and when cooled retains its form without delamination and loss of tensile strength is a surprising outcome. The controlled environment and the factors necessary to ensure that the forming process is successful allow the laminate product to change in molecular structure at exactly the right time and effect to produce a successful and different structural outcome.

Catalyst for Resin Curing

As mentioned above, a catalyst is required to cure the resin. It acts as an initiator for curing the resin. The general catalyst type suitable for the invention is a free radical inhibitor, preferably a MEKP (methylethyl ketone peroxide catalyst). One catalyst we have used successfully is our F00826 coded Catalyst (MEKP 40%) QC. It is a MEKP catalyst, with the following components:

| Dimethyl phthalate/dipropylene glycol phlegmatiser | 30-70% |
|---|---|
| Methyl ethyl ketone peroxide | 30% |

-continued

| Methyl ethyl ketone | 0-10% |
| 2,4-pentanedione peroxide | 0-10% |

It has a self-accelerating decomposition temperature (SADT) of approximately 60° C.

Gel and Cure Times; Procedure

Gel time refers to the point at which the catalyst and resin have crossed from an unstable liquid state to a state of at least semi hardness, or state of stability. If the early part of the curing or bonding (to the outer sheets) is disturbed then this could result in ultimate delamination. However, there is a time during the gel stage, before full cure, when the sheet may be manoeuvred, cut, and stored for a full cure time. It is important not to lift, bend or stress the sheet but rather to slide and manoeuvre the sheet along an aerated flat bed surface or flat belt feed table/conveyer.

The set time—refers to the point in time in which catalyst and resin complete cure and full adhesion to the sheet surfaces has occurred.

The time of complete cure and set will depend on the manufacturing process being used. By maximising the amount of catalyst and or accelerators and heating the NC007 system will dramatically accelerate the cure time. However whatever process is used a recommended period of 12 hours in storage prior to use.

c) Preparation of the Laminate

As mentioned previously, there are 3 main ways like laminate or the invention can be prepared. A batch process, (e.g. using a jig to hold sheets in place), a continuous process whereby the resin is poured or inserted between the sheets in a manufacturing line or alternatively using three solid sheets (two thermoplastic with the resin) and placing in contact with heating. The batch process is illustrated in the Examples. Typically in the batch process an amount of resin is mixed with the corresponding amount of catalyst using a mechanically assisted paddle. It is stirred for 2 minutes, allowed to stand for 2 minutes, or vibrated to allow excess air bubble removal. The formula is then poured directly into the cavity sample held within the cradle, a fine brass meshed funnel is used to further assist mixing and aiding in further removal of trapped air bubbles.

Figure 11:
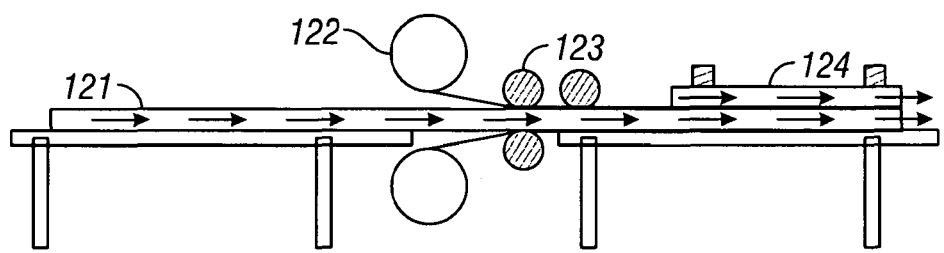
FIG. 11 illustrates one form of continuous manufacturing.

One form of continuous process could be as illustrated in FIG. 11. This involves applying two outer thermoplastic sheets to pre-mixed resin. The variants of this include using simply pre-mixed (still runny) resin; semi-set (jelly-like) resin and fully set resin which is then heated to soften and applied. The Figure illustrates a semi-set resin 121 and rolls of outer skin 122. The laminate proceeds through press rollers 123 to a mobile caterpillar pressure plate 124. An outer edge dam rubber or caterpillar rotating outer edge seal is optional (to prevent overflow of liquefied resin during manufacture).

It should be noted that often thermoplastic sheeting is supplied from the manufacturer with a protective plastic or paper. This can be on one or both side(s). It should be removed prior to laminate preparation.

d) The Bond Between the Acrylic/P.E.T.G and the Resin

As mentioned previously, the bond between the resin is an important feature of the invention. In the preferred embodiment the resin includes 30-45% styrene content. This styrene plays an important role in the preferred bond formation. Without being bound by the following theory we believe the presence of the styrene can soften the surfaces of the outer thermoplastic layers and allow some penetration of the resin. Further we believe it is able to cross link with the outer thermoplastic layers to create the bonding. For example with acrylic outer sheets, the styrene monomer of the resin is able to cross link with any residual methyl methacrylate sites of the acrylic.

e) Bending/Forming the Laminate

The thermoforming or shaping process is one preferred forming method. It involves forming the flat laminate sheets into the desired shape by concentrating the required heat, in and onto a particular area rather than the system of having the whole sheet oven heated. Thus a particular area of the sheet may be bent/shaped at a temperature which the acrylic, or P.E.T.G softens and the unsaturated polyester resin changes consistency such as will allow the panel or sheet to be formed into the desired shape.

Commonly in the art forming occurs via strip forming. This involves heating a sheet from one side, relying on one radiated heat source to pass through the entire sheet prior to bending.

The single side heating approach is efficient and acceptable for normal and standard non-ply sheet. However it is not preferred for our laminate (but is still possible under certain conditions).

The temperature and time need to penetrate our ply sheet samples is critical as an undesired annealing process can take place if the temperature is too high for too long. The time and temperature required to penetrate our ply sheet with a single heat strip forming bar/heating from one side may result in an annealing effect of the heat exposed side of the sheet resulting in crazing, shattering or snapping the outer sheet to splitting the core ply and delamination during the forming process. We use a process of directing a heat source from both top and bottom, allowing a deeper more even penetration meeting toward the core of the ply. For a particular laminate structure there will be a desired temperature and time period to bring about correct malleability and prevent an annealing of the sheet surface and delamination a and fault. It is therefore important to not exceed the correct forming temperature and time period.

f) Optional Features i) Mar Coating

An optional mar coating can be used to enhance resistance to abrasive or chemical attack. While two-side coated laminate (i.e. on the outer sides of the laminate) provides maximum protection, one-sided coated laminate offers economical advantages for application where only one side of the sheet is exposed.

ii) UV Protection

We can include UV inhibitors within the thermoset resin in order to enhance the UV resistance of the laminate. The UV resistance enhances the properties of the laminate as a building material (by protecting what is inside the building) but also increases the longevity of the laminate itself.

iii) Colour/Tinted/Clear

It is possible to provide a colouring/tinting finish to the laminate by use of coloured or tinted thermoplastic sheeting. Both opaque and translucent laminates can be prepared by appropriate selection of the sheets. Alternatively transparent thermoplastic sheeting can be used and we can tint or colour the thermo set resin as would be known by one skilled in the art. Colouring of the resin mix can be carried out with pigments. The choice of a suitable pigment material, even though only added at about 3% resin weight, must be carefully considered as it is easy to affect the curing reaction and degrade the final laminate by use of unsuitable pigments.

iv) Fire Retardant

Figure 5:
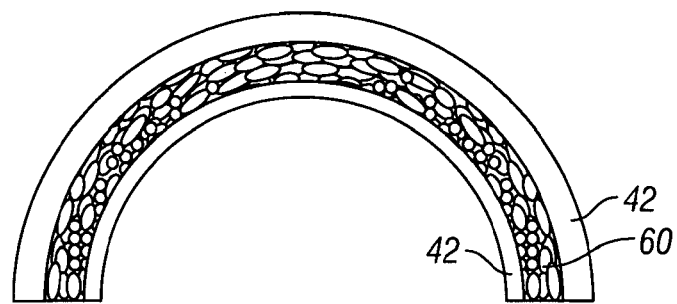
FIG. 5 illustrates the use of fire retardant and foamed resin materials.

As shown in FIG. 5, fire retardant materials can be added to the thermoset resin 60, which is sandwiched between the outer thermoplastic sheets 42. It is likely a drop in transparency will be the result of this however.

v) Fillers

We can also use filler materials within the resin for a variety of reasons including:
 To reduce the cost of the moulding
 To facilitate the moulding process
 To impart specific properties to the moulding Fillers are often added in quantities up to 50% of the resin weight although such addition levels will affect the flexural and tensile strength of the laminate. The use of fillers can be beneficial in the laminating or casting of thick components where otherwise considerable exothermic heating can occur. Addition of certain fillers can also contribute to increasing the fire-resistance of the laminate.

vi) Other Possibilities

Other vinyls, metallic panels, such as aluminium, and fire retardant materials may be bonded and pressed to the outer layer of the resin sheet for requirements and cosmetics in the building industry. We can also place transfers, articles, and objects such as solar pick up panels within the resin formula within the cavity creating a solar glazing panel.

g) Advantages of the Laminate of the Invention

Figure 10:
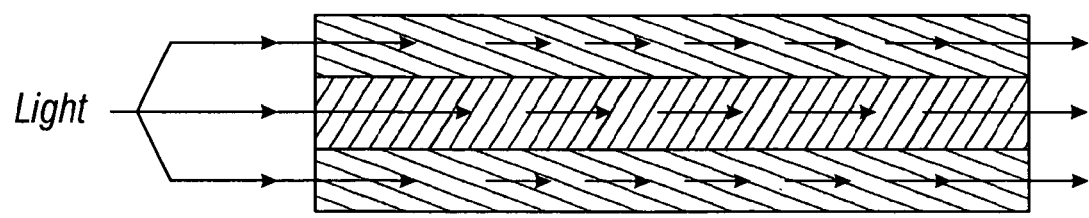
FIG. 10 illustrates light travel in the laminate of the invention.

One preferred embodiment of the laminate sheet of the invention provides one or more of the following advantages when compared to glass:
 Improved optical clarity
 Ease of fabrication
 Abrasion resistance
 Lightweight—half weight of glass
 Chemical resistance
 Strength—improved impact strength compared with glass
 Improved acoustic resistance
 Workable—skill saw cutting, drill and router
 Thermal resistance
 Thermoformability h) Blue Effect/Hazing At times the product laminate can have hazing or blue lining. This tends to be due to one of three causes:
1) the effect of refraction due to the fibre optic effect of the sheet and formula eg; the edge of the sheet when exposed to light absorbs the light and allows light to travel the length of the sheet (see FIG. 10). At cure if there is a significant distortion in the outer sheet surface, or detour of the line of light travel, internal reflection may result, giving the appearance of a light blue, smoke haze.
2) The incorrect catalyst mix can cause the inner cavity formula to appear cloudy rather than having the same light refraction as the acrylic sheet, again causing internal reflection.
3) There is the possibility that the inner cavity sheet surface has been slightly tainted due to the percentage of non-styrene resistance.

Remedy for blue hazing:
 The outer edge of the sheet can been sealed to prevent light travel;
 Ensure the jig or other setting apparatus results in a flat surface for curing;
 Ensure the correct catalyst mix percentage
 Ensure the correct sheet/styrene percentage
 Use a range of translucent tints.

EXPERIMENTAL

Example 1

One Preferred Formulation

The tests samples 300 mm×300 mm of continuous and cell cast acrylic called Shinkolite™ of Mitsubish Rayon, Japan were used. They were set in place in the jig to prevent distortion and set at 30° angle for pouring so any air bubbles may rise. Vibration can be applied to speed the release of any air.

The mixture of resin and Catalyst were as follows
Resin NC007 500 grms
Catalyst NA1 5 grms
Mix time 2 min
Mix temp 20°
Mix humidity 62%
Setting temp 22°
Humidity 67%

The sample pour can remain in upright in the jig during the cure process in a hot box. Alternatively the entry hole (used for the filling) can be plugged and then sample laid flat for curing in the hot box.

Generally samples should be left at least 8 hours before handling. In order to speed this up post-curing can be used.

Post curing can be a matter of preparing the catalyst within the resin some time prior to the pour so as the gel time can be due at introduction to the cavity rather than the gel time being to long within the sheet on the table therefore slowing down production. Ideally while the process is continually on the move the sheet should be at gel stage after five or so meters ready for cutting to length and storage. More catalyst and the heating of the sheet and resin during pour would speed up the cure time dramatically also. We can also add a gel accelerator.

Example 2

Cleaning and Preparing Cavity Side of Sheet

This can be necessary due to possible contamination from the various adhesives used with protective plastic wrap, which can be applied by some manufacturers. Simply, the adhesive glue is removed with an appropriate cleaner. We have used methylated spirits (both industrial and household) but find iso propyl Alcohol is the most preferred. The preferred cleaner will depend upon the different wraps used by the different manufacturers.

Alternatively we use the acrylic, or P.E.T.G. sheeting provided as a sheet or roll without the protective coating, or used on one side only. The protective coating would be left on the outside of the laminate sheets (i.e. not on the side of the sheets in contact with the resin).

Example 3

Pour Conditions

One preferred resin used in the laminate manufacture is our NC007 resin. It is a dissolved styrene unsaturated Polyester Resin.

The following Table B presents our investigations of pour conditions of the P.E.T.G. and acrylic sheeting with this resin.

| Sample | Date | Mix temp | Mix hum | Box temp | Box hum | Resin g | Cat g | Set time | Result |
|---|---|---|---|---|---|---|---|---|---|
| Taiwan cast Acrylic | 16 Oct. 2005 | 20° C. | 62 | 22° C. | 67 | 500 g | 5 g 1% | 8 hrs | Good no crazing |
| Taiwan cast Acrylic | 17 Oct. 2005 | 21° C. | 58 | 32° C. | 67 | 500 g | 5 g 1% | 8 hrs | Not good crazing |
| Taiwan cast Acrylic | 18 Oct. 2005 | 21° C. | 63 | 36° C. | 65 | 550 g | 4 g 0.75 | 8 hrs | Not good crazing |
| Taiwan cast Acrylic | 19 Oct. 2005 | 22° C. | 64 | 22° C. | 58 | 550 | 4 g 0.75 | 6 hrs | Good no crazing |
| Asia Poly cast Acrylic | 20 Oct. 2005 | 21° C. | 65 | 22° C. | 58 | 500 g | 5 g 1% | 6 hrs | Good no crazing |
| Asia Poly cast Acrylic | 21 Oct. 2005 | 23° C. | 63 | 36° C. | 65 | 550 g | 4 g 0.75 | 8 hrs | Not good crazing |
| Asia Poly cast Acrylic | 22 Oct. 2005 | 21° C. | 67 | 18° | 58 | 550 g | 4 g 0.75 | 8 hrs | Good no crazing |
| Mitsub Japan C/cast Acrylic | 23 Oct. 2005 | 18° C. | 64 | 18° C. | 58 | 550 g | 4 g 0.75 | 8 hrs | Slight crazing |
| Mitsub Japan C/cast Acrylic | 24 Oct. 2005 | 20° C. | 64 | 22° C. | 58 | 500 g | 5 g 1% | 8 hrs | Slight crazing |
| Australia High Impact Acrylic | 25 Oct. 2005 | 22° C. | 65 | 18° C. | 58 | 550 g | 4 g 0.75 | 8 hrs | Slight crazing |
| Australia High Impact extruded Acrylic | 26 Oct. 2005 | 19° C. | 66 | 18° C. | 58 | 500 g | 5 g 1% | 8 hrs | Slight crazing |
| PTEG Blue non UV | 27 Oct. 2005 | 20° C. | 64 | 18° C. | 58 | 500 g | 5 g 1% | 8 hrs | Translucent Hazy |
| PETG Blue non UV | 28 Oct. 2005 | 18° C. | 66 | 18° C. | 64 | 550 g | 4 g 0.75 | 8 hrs | Translucent Hazy |

Size: 300 mm x 300 mm x 2 mm thick

Temperature, mix, and times of test sample sheets (All samples methylated spirit cleaned)

Figure 8A:
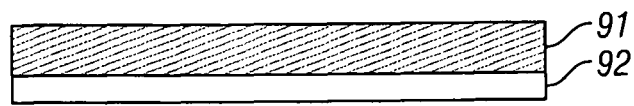
FIGS. 8a and 8b illustrates part of the process of Example 3.
Figure 8B:
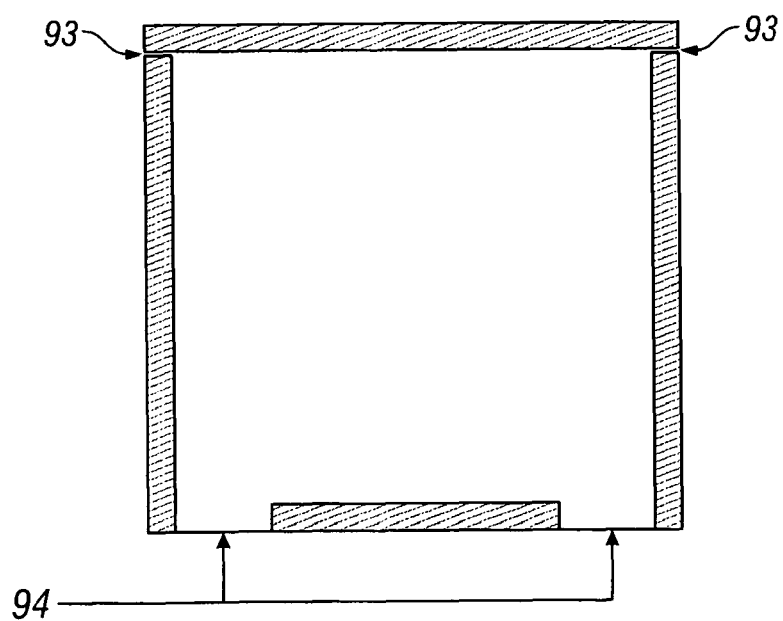

FIG. 8a illustrates the end view of the pour apparatus. The outer edge seal/dam rubber is made up of a closed cell pvc foam sealing tape 25 mm in width with a single adhesive side 91. After the 300 mm×300 mm sample sheet (of acrylic or PETG) 92 is prepared and cleaned the tape is laid out and cut to length, protective tape removed from one side exposing the adhesive. The tape 91 is then placed adhesive side down around outer inside edge of the sheet 92. Joins in the tape 93 at the corners need to be sealed with Soudal High Tak sealant or equivalent polyester compatible sealant. Then Soudal High Tak sealant was applied to the exposed top surface of the pvc sealant tape giving adhesive seal for the top sheet.

Figure 9:
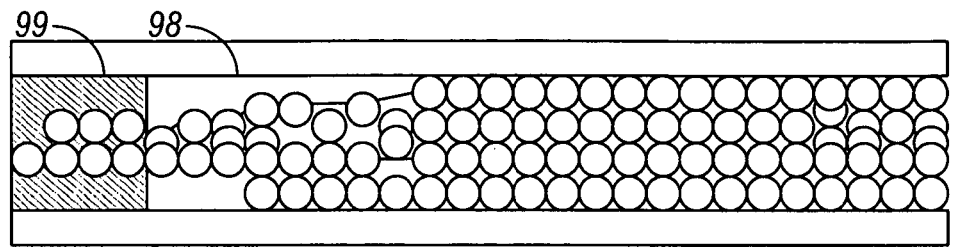
FIG. 9 illustrates delamination; due to absorption of resin into incorrect rubber type dam seal.

A gap 94 at the two top corners is essential for the filling of resin and escape of air. The dam rubber must be compatible with the resin formula, if not the resin will seep into the dam seal drawing resin away from the sheet along the outer edges, causing delamination as illustrated in FIG. 9. FIG. 9 shows delamination and air gap 98 due to resin soaking into the rubber dam seal 99.

At the time of mixing care needs to be taken not to allow over speed of mixing machinery as this can over aerate the formula, if this happens a period of time is needed to allow the bubbles to surface otherwise vibration of the curing frame is necessary.

Small amounts of air may enter the formula while pouring, while rising to the surface the outer edge bubbles can at times cling to the side edges of the rubber this is not a problem as the edge is cut away after cure air bubbles within the sheet do not cause delamination or contamination but rather a cosmetic nuisance.

Figure 7C:
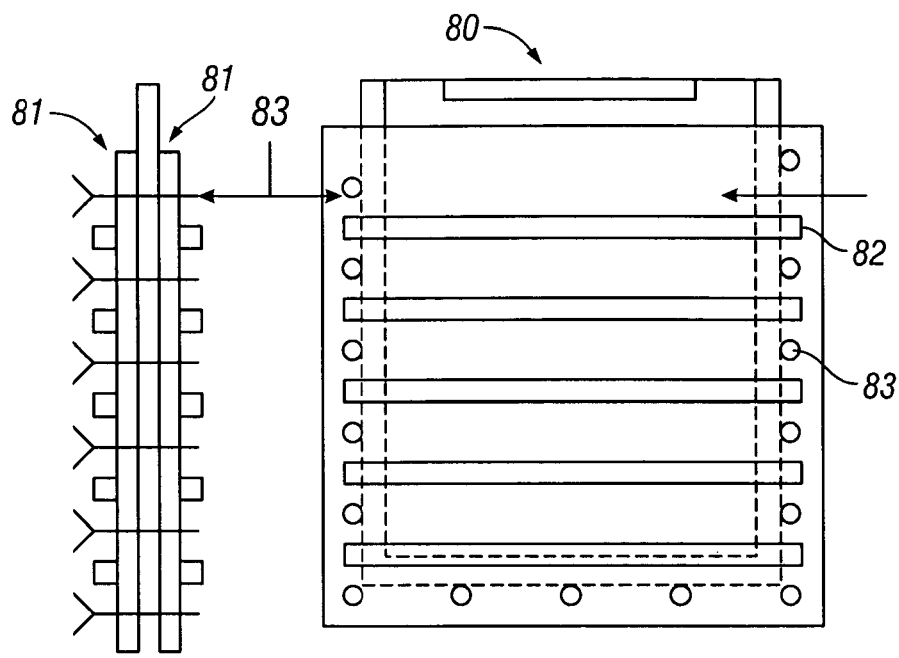
Figure 7C:
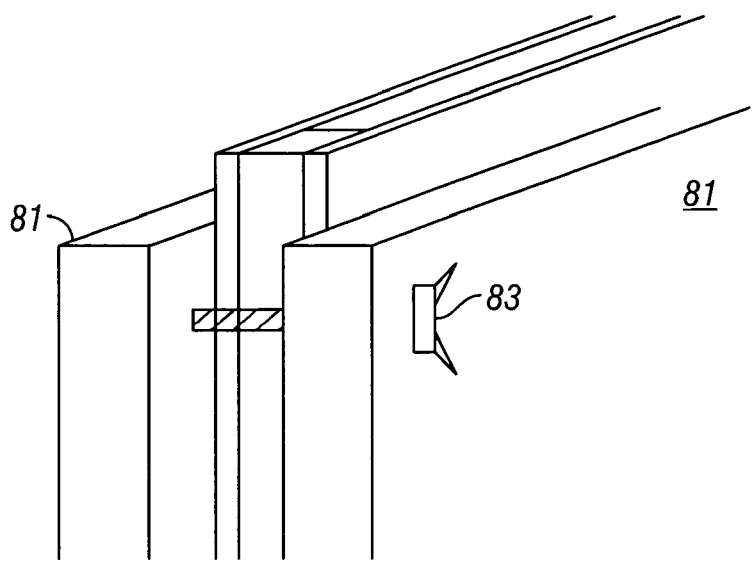

With reference to FIGS. 7a, b and c (cross sectional, side and perspective views) a jig apparatus 80 was prepared for use with all samples. This enabled the sheets 81 to be held parallel whilst the resin was poured from above.

The jig was engineered from 15 mm thick Acrylic sheet 81 and braced horizontally with 10 mm ribbing 82 and held in place using nuts 83. It was important not to over-tighten the outer edge of the jig as a concave appearance will show on the final product resulting in visual distortion to the sample.

Example 4

Annealing

As discussed previously, styrene resistance of the outer thermoplastic sheeting is an important feature of the invention. Our preferred invention uses sheeting which has an inherent styrene resistance. However it is also possible to anneal the sheeting prior to incorporation into the laminate in order to impart styrene resistance.

The following Table A relates to annealing Sample plates of Acrylic and PETG sheet sourced from various plastic sheet manufacturers, Samples sheet size, 3 mm Thick×150 long×75 mm wide, these where then cleaned with isopropyl-alcohol, placed into a cool oven on a flat non stick surface. Some samples were placed between sheets to prevent blistering or distortion. They were heated to the stated conditions and allowed to cool down over a period of 1 hour.

Samples were then re-cleaned, a dam rubber applied to the outer inner edge sealed and poured (under specific humidity and temperature conditions) with the resin formulation NC007 then placed into a preset temperature and humidity controlled environment for completion of cure.

TABLE A

| Sample | Time in oven | Temp ° C. | Results | Comments after pour |
|---|---|---|---|---|
| 2 mm Asia Poly Cast Meth cleaned | 1 Hour | 80-90° C. | Good Slight bow Slight blistering Lamp only | Not poured due to blistering, would give false readings |
| 2 mm Asia Poly cast Non Meth cleaned | 1 Hour | 80-90° C. | Good slight bow Slight blistering Lamp only | As above |
| 1 mm PTGE (blue) Meth cleaned | 1 Hour | 80-85° C. | Severe blistering and curling Lamp only | As above |
| 1 mm PTGE (blue) Meth cleaned | 45 Min | 50-60° C. | Blistering and curling Lamp only | As above |
| 1 mm PTGE (blue) Meth cleaned | 45 Min | 70-80° C. | Placed between sheets of glass Excellent result | Slight hazing but translucent colour could be added Good bonding |
| 1 mm PTGE (red) Meth cleaned | | | | UV protected Test to be carried out plus comparison between results of blue non-UV PETG |
| 1 mm PTGE (blue) Meth cleaned | 2 Hours | 75-80° C. | Placed between sheets of glass Excellent result | Slight hazing but translucent colour could be added Good bonding |
| 2 mm Asia Poly Cast/Meth Cleaned | 1.5 Hours | 95-98° C. | Placed on heat proof paper | No crazing Good bonding |
| 2 mm Asia Poly Cast Non Meth Cleaned | 1.5 Hours | 95-98° C. | Placed on heat proof paper | As above |
| 2 mm Taiwan Continues Cast Meth Cleaned | 1.5 Hours | 95-98° C. | Placed on heat proof paper | As above |
| Taiwan Continues Cast Non Meth Cleaned | 1.5 Hours | 95-98° C. | Placed on heat proof paper | As above |
| 2 mm Japanese Continues Cast Meth Cleaned | 1.5 Hours | 95-98° C. | Placed on heat proof paper | As above |
| 2 mm Japanese Continues Cast Meth Cleaned | 1.5 Hours | 95-98° C. | Placed on heat proof paper | As above |

Preferred sheet Shinkolite from Mitsubishi Rayon Japan

In general there was much improvement in the crazing of the samples. Results of the annealing studies showed styrene resistance can be imparted. However this is an inefficient and costly method of doing so. Thus whilst being within the scope of the invention, it is not a preferred step or characteristic.

Example 5

Forming/Folding of the Laminate

We tested a number of different combinations for their ability to thermoform. One preferred laminate consisted of two opposite outer layers of 2 mm acrylic sheet with an inner cavity barrier layer of 2 mm resin formula, forming an overall 6 mm sandwich or ply material for testing. The acrylic sheet used was Shinkolite (Mitsubishi Rayon Japan) though other suppliers can also provide suitable acrylics. The inner cavity material consisted of unsaturated polyester resin formula with 0.75 w/w (weight for weight) catalyst, e.g. 7.5 grams per liter of resin formula forming the said sandwich/ply sample, with an overall thickness of 6 mm.

Four samples of 300 mm×300 mm×6 mm thick were prepared. The pre poured sheet was poured at a room temperature of 20° C. and a humidity of 65% with curing time 6 hours, gel set time 1 hour. The sheets were placed in sealed controlled atmosphere, temperatures pre set to 20° C. Humidity 65%.

We attempted to pinpoint an optimum temperature for the maximum achievable curvature through a process of thermoforming.

Apparatus: Flat bed fan oven with an internal flat floor layer of Teflon mesh to prevent possible adhesion of test product to oven interior, having also a sealed glass inspection door for viewing.

Method: Place sample face down onto the Teflon oven base, the preheated oven temperature being 110° C., for a period of 10-12 minutes.

The sample sheet is then corner test lifted by a cotton-gloved hand. When the edge is at a stage of malleability the ply sheet is then removed by sliding a flat spatula underneath to prevent pre-distortion and unnecessary exaggerated movement.

Forming method: Various Formed structures of ply MDF sheet curvature were prepared prior to sheet extraction from oven to a bench top so there is limited chance of movement as the sheet is clamped and manipulated over the chosen shape. To maximize the stress and to identify failure point of the experiment, a 45° angle with various degrees of sharpness at curvature was used.

Figure 6:
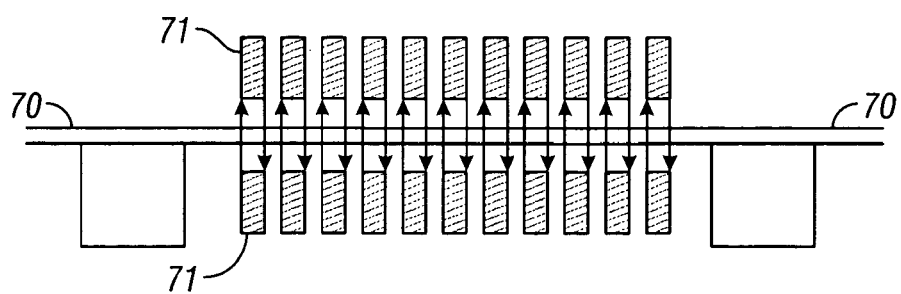
FIG. 6 preferred thermoforming heating process.

The hot sheet was then directly placed over the mould and manipulated by hand to form and take the general shape of the mould, then at the latter stage clamped, secured and set in place to re cure. This is illustrated in FIG. 6. The heat source 71 is a double sided heat source applied to the laminate 70. Single sided heating is not ideal for our laminates.

Results of forming:

No crazing

Delaminating centrally and along outer edging only occurred when the sample sheet was left to form and hold the intended shape without pressure and forced forming.

Results: We found that in all cases using severe curvature (45 degrees or more) it is necessary to have a complete marrying of the ply forms equal to outer e.g. having the sample sheet pressed between equal outer curvatures therefore the sample sheet becomes a cavity between the outer moulds, a pressure of 2 kilos is sufficient. It is preferably to allow a time of between 12 to 15 minutes before release.

Where in the foregoing description reference has been made to elements or integers having known equivalents, then such equivalents are included as if they were individually set forth.

Although the invention has been described by way of example and with reference to particular embodiments, it is to be understood that modifications and/or improvements may be made without departing from the scope or spirit of the invention.

In addition, where features or aspects of the invention are described in terms of Markush groups, those skilled in the art will recognise that the invention is also thereby described in terms of any individual member or subgroup of members of the Markush group.

What is claimed is:

1. A method of curving a planar laminate to form a laminate product having at least one curved area, comprising the steps of:
   providing a planar laminate, said planar laminate comprising two or more sheets of an acrylic or polyethylene terephthalate glycol ("PETG") thermoplastic, or sheets including an acrylic or PETG thermoplastic, spaced by, but attaching to, an interposed thermoset polyester system, wherein, said thermoset polyester system comprises a co-reactive monomer, wherein said co-reactive monomer is styrene or a styrene analog that is present in the thermoset polyester system in a quantity from 30-55% by weight, and wherein the interposed thermoset polyester system has an elongation at break greater than 150% and a glass transition temperature less than ambient temperature;
   heating the planar laminate to a shaping temperature, wherein said heating step involves concentrating heat in and onto a particular area of the planar laminate from both sides of the planar laminate, without heating the entire planar laminate, without producing any substantial degradation of the lamination or its component layers;
   shaping the particular area of the planar laminate to the desired curvature; and
   cooling the laminate.

2. A method of claim 1 wherein said heating comprises heating the planar laminate into the range of from 105° C. to 120° C.

3. A method of claim 1 wherein one or both sheets is an acrylic plastic or is at least primarily acrylic plastic.

4. A method of claim 1 wherein said thermoset polyester system has been prepared at least in part from (A) carboxylic acid(s) or dicarboxylic acid(s) with (B) a component or components providing (a) hydroxyl(s) and/or dihydroxyl(s).

5. A method of claim 1 wherein said thermoset polyester system has been prepared at least in part from (A) carboxylic acid(s) or dicarboxylic acid(s) with (B) a component or components providing (a) hydroxyl(s) and/or dihydroxyl(s), and wherein said thermoset polyester system involves a co-reactive monomer, and wherein said co-reactive monomer is styrene that is present in the thermoset polyester system in a quantity of/from 35-45% w/w.

6. A method of claim 1 wherein the thermoset polyester system is of a polyester resin containing ethylenic unsaturation is present in the range of from 45-70% w/w.

7. A method of claim 1 wherein the thermoset polyester system is or has been catalysed by free radical initiators.

8. A method of claim 1 wherein the thermoset polyester system is or has been catalysed by a peroxide free initiator.

9. A method of claim 1 wherein the thermoset polyester system is or has been catalysed by MEKP (Methyl Ethyl Ketone Peroxide).

10. A method of claim 1 wherein the thermoset polyester system is or has been catalysed by a peroxide free initiator, and wherein a metal salt promoter is present.

11. A method of claim 1 wherein the thermoset polyester system is or has been catalysed by free radical initiators, and wherein the level of any such initiator is no more than about 2% w/w of the polyester system prior to the thermoset.

12. A method of claim 1 wherein the thermoset polyester system is or has been catalysed by free radical initiators, and wherein the level of such an initiator is less than 1% w/w of the thermoset polyester system.

13. A method of claim 1 wherein the lamination of the laminate involves the laying between flat sheets, or the laying on one flat sheet and subsequent placement of the second flat sheet, of a liquid polyester resin system and thereafter allowing its thermoset.

14. A method of claim 1 wherein the lamination of the laminate involves the laying between flat sheets, or the laying on one flat sheet and subsequent placement of the second flat sheet, of a liquid polyester resin system and thereafter allowing its thermoset, wherein the polyester resin system is a mix of:
   45-70% w/w unsaturated polyester resin containing ethylenic unsaturation,
   30-55% w/w styrene,
   less than 2% w/w MEKP, and
   less than 2% w/w metal salt promoter.

15. A method of claim 1 wherein the thermoset polyester resin system is mixed in the temperature range 18 to 22° C.

16. A method of claim 1 wherein the thermoset polyester resin system is set at temperature(s) in the range 20° C. to 24° C.

17. A method of claim 1 wherein the thermoset polyester resin system is mixed at a humidity in the range 57% to 67%.

18. A method of claim 1 wherein the polyester resin system is allowed to thermoset at a humidity in the range of from 57% to 75%.

19. A method of claim 1 wherein the surface of the or any acrylic plastic which is to interface with the thermoset polyester system is a clean face substantially free of release agents and/or migrating materials from any removed cover sheet.

20. A method of claim 1 wherein the surface of the or any acrylic plastic which is to interface with the thermoset polyester system is a clean face substantially free of release agents and/or migrating materials from any removed cover sheet, wherein the surface of the sheet(s) has been subjected to cleaning with a solvent.

21. A method of claim 1 wherein the surface of the or any acrylic plastic which is to interface with the thermoset polyester system is a clean face substantially free of release agents and/or migrating materials from any removed cover sheet, wherein said sheet(s) has had the surface thereof to be presented to the polyester system, prior to its thermoset, cleaned with isopropyl alcohol.

22. A method of claim 1, wherein said without producing any substantial degradation involves some deformation of each layer but does not lead to any substantial detachment of the thermoset polyester system attachment to each said sheet.

23. A method of claim 1 wherein throughout the curving process the interposed polyester system has remained non-liquid.

24. A method of claim 1, wherein the planar laminate is transparent.

25. A method of claim 1 wherein the thermoset polyester system layer is at least 0.5 mm thick and accounts for from 5% to 40% of overall laminate thickness.

26. A method of claim 1 wherein the thermoset polyester system layer is at least 1 mm thick.

27. A method of claim 1 wherein the planar laminate is a transparent planar laminate comprising two or more sheets of a transparent thermoplastic, or sheets including a transparent thermoplastic (same or different), spaced by, but attaching to, an interposed transparent thermoset polyester system, wherein the thermoplastic layers attach to the polyester system by both
- cross linking with free unsaturation in acrylic material,
- free monomer solvation of acrylic material,
- and wherein each thermoplastic layer is an acrylic or PETG,
- and wherein all layers of the planar laminate are heated to a temperature or temperatures unable to melt any layer of the planar laminate to a liquid form.

28. A method of claim 1 wherein the planar laminate is a transparent planar laminate comprising two or more sheets of a transparent thermoplastic, or sheets including a transparent thermoplastic (same or different), spaced by, but attaching to, an interposed transparent thermoset polyester system, wherein all layers of the planar laminate are heated to a temperature or temperatures unable to melt any layer of the planar laminate to a liquid form, and wherein the transparent laminate is greater than 3 mm thick.

29. A method of claim 1 wherein the planar laminate is a transparent laminate comprising two or more sheets of a transparent thermoplastic, or sheets including a transparent thermoplastic (same or different), spaced by, but attaching to, an interposed transparent thermoset polyester system, wherein all layers of the planar laminate are heated to a temperature or temperatures unable to melt any layer of the planar laminate to a liquid form and wherein the thermoset polyester system is at least 0.5 mm thick and each thermoplastic layer comprises an acrylic or PETG.

30. A method of claim 1 wherein the planar laminate is a transparent laminate comprising two or more sheets of a transparent thermoplastic, or sheets including a transparent thermoplastic (same or different), spaced by, but attaching to, an interposed transparent thermoset polyester system, wherein all layers of the planar laminate are heated to a temperature or temperatures unable to melt any layer of the planar laminate to a liquid form and wherein the thermoset polyester system is at least 0.5 mm thick and each thermoplastic layer comprises an acrylic or PETG, and wherein the thermoset polyester system can account for from 5% to 40% of overall laminate thickness.

31. A method of claim 1 wherein the planar laminate is a transparent planar laminate comprising two or more sheets of a transparent thermoplastic, or sheets including a transparent thermoplastic (same or different), spaced by, but attaching to, an interposed transparent thermoset polyester system, wherein all layers of the planar laminate are heated to a temperature or temperatures unable to melt any layer of the planar laminate to a liquid form and wherein the thermoset polyester system layer is at least 1 mm thick.

32. A method of claim 1 wherein the planar laminate is a transparent planar laminate comprising two or more sheets of a transparent thermoplastic, or sheets including a transparent thermoplastic (same or different), spaced by, but attaching to, an interposed transparent thermoset polyester system, wherein all layers of the planar laminate are heated to a temperature or temperatures unable to melt any layer of the planar laminate to a liquid form and wherein the planar laminate has a performance related to a notional symmetric variant having acrylic layers 2 mm thick on the outside with a core of a polyester system 2 mm thick, the notional variant being able without fracture and/or delamination to withstand a challenge loading in excess of 40 tones into its edges, on its minor axis if notionally a rectangle of 960×470 mms.

33. A method of claim 1 wherein the planar laminate is a transparent planar laminate comprising two or more sheets of a transparent thermoplastic, or sheets including a transparent thermoplastic (same or different), spaced by, but attaching to, an interposed transparent thermoset polyester system, wherein all layers of the planar laminate are heated to a temperature or temperatures unable to melt any layer of the planar laminate to a liquid form and wherein the transparent thermoset polyester resin system is in the form of:
- 45-70% w/w unsaturated polyester resin containing ethylenic unsaturation,
- 30-55% w/w styrene,
- less than 2% w/w MEKP, and
- less than 2% w/w metal salt promoter.

* * * * *